United States Patent [19]

Schaper et al.

[11] Patent Number: 4,795,726
[45] Date of Patent: Jan. 3, 1989

[54] METHOD FOR THE REGENERATION OF SPENT ALUMINA-BASED CATALYSTS

[75] Inventors: Hennie Schaper; Herman W. Kouwenhoven, both of Amsterdam, Netherlands

[73] Assignee: Shell Oil Company, Houston, Tex.

[21] Appl. No.: 42,908

[22] Filed: Apr. 27, 1987

[30] Foreign Application Priority Data

Apr. 29, 1986 [GB] United Kingdom ................. 8610442

[51] Int. Cl.$^4$ .......................... B01J 20/20; B01J 23/94; B01J 38/66
[52] U.S. Cl. ....................................... 502/26; 208/217; 208/251 H; 423/68; 423/150; 502/55; 502/516; 502/517
[58] Field of Search ....................... 502/26, 25, 54, 55, 502/517, 516

[56] References Cited

U.S. PATENT DOCUMENTS

| | | | |
|---|---|---|---|
| 3,168,481 | 2/1965 | Erickson | 502/516 |
| 3,182,011 | 5/1965 | Friedman | 502/516 |
| 3,224,961 | 12/1965 | Erickson et al. | 502/516 |
| 3,567,433 | 3/1971 | Gutnikov | 75/103 |
| 4,409,190 | 10/1983 | Van Leirsburg | 423/150 |
| 4,454,240 | 6/1984 | Ganguli | 502/26 |

FOREIGN PATENT DOCUMENTS

| | | | |
|---|---|---|---|
| 738660 | 6/1980 | U.S.S.R. | 502/25 |
| 1526927 | 10/1978 | United Kingdom . | |

*Primary Examiner*—Paul E. Konopka

[57] ABSTRACT

Method for the regeneration of spent alumina-based catalysts wherein the catalyst firstly is treated with steam at elevated temperature in order to remove at least part of the sulphur; subsequently with an oxygen-containing gas at elevated temperature, in order to burn off carbonaceous matter and finally with a basic medium.

14 Claims, No Drawings

METHOD FOR THE REGENERATION OF SPENT ALUMINA-BASED CATALYSTS

FIELD OF THE INVENTION

The present invention relates to a method for the regeneration of spent alumina-based catalysts by removal of at least part of carbon and contaminating metal.

DESCRIPTION OF THE STATE OF THE ART

During catalytic processes wherein metal contaminated hydrocarbon feedstocks are treated with hydrogen carbonaceous matter and metals such as vanadium and nickel deposit on the catalysts, as a result of which their activities gradually decrease. When metals and carbonaceous matter are continuously deposited on the catalysts, the latter eventually have to be replaced. Substituting the deactivated catalysts with fresh batches and discarding the deactivated spent catalysts would be a costly procedure. In general it is much more attractive, if possible, to regenerate the spent catalysts and use them again in catalytic processes.

Methods for the regeneration of spent supported catalysts are well documented in the art. It is known from British patent specification No. 1.526.927 that the removal of at least part of coke from deactivated supported catalysts can suitably be performed by treating such catalysts at elevated temperature with an oxygen-containing gas. A intrinsic drawback of this treatment comprises the large amount of heat evolved as a result of the exothermic oxidation of sulphur, which is present in the catalyst as metal sulphide(s). So in order to avoid the occurrence of extremely high temperatures it is necessary to remove at least part of the sulphur from the spent catalysts prior to their treatment with the oxygen-containing gas.

According to British patent specification No. 1.526.927 sulphur can be removed from silica-based spent catalysts by contacting said catalysts at elevated temperatures with steam.

It is also known from British patent specification No. 1.526.927 that contaminating metals—in essence vanadium and nickel —can be removed from spent silica-, silica-alumina- or alumina-based catalysts by extracting the deactivated catalysts with an aqueous solution of a mineral acid.

Unexpectedly it has now been experienced that spent alumina-based catalysts—in contrast to silica-based catalysts—can hardly stand the decoking and subsequent demetallization procedures described in said British patent specification.

The alumina support appears to be liable to deterioration and the treatment with an oxygen-containing gas followed by extraction with acid causes an unacceptable loss of surface area and side crushing strength.

It is therefore an object of the present invention to provide a method for the regeneration of spent alumina-based catalysts, which reactivates the spent catalysts in such a way that they can be used again for catalytic purposes, without inflicting concomitantly serious damage upon properties of the catalyst materials which are important for catalytic applications such as surface area and crushing strength.

Surprisingly it has now been found by applicants that exposing spent alumina-based catalysts successively to a treatment with steam at elevated temperature, a treatment with an oxygen-containing gas at elevated temperature and a treatment with a basic medium, results in substantially regenerated catalysts which have retained in essence their catalytic properties. Thus spent alumina-based catalysts which have been exposed to the above-mentioned three-step treatment are suitable for being used again in catalytic processes.

SUMMARY OF THE INVENTION

The present invention therefore relates to a method for the regeneration of spent alumina-based catalysts by removal of at least carbonaceous material and contaminating metal(s) under controlled conditions comprising contacting said catalysts with steam at elevated temperature, thereafter burning the carbonaceous matter therefrom in the presence of an oxygen-containing gas and subsequently treating it with a basic medium.

It should be noted that is is known from U.S. Pat. No. 4,409,190 to remove cobalt from a spent supported catalyst after carbon has been burned off therefrom, by treating the catalyst firstly with an aqueous basic solution and secondly with an aqueous cyanide solution.

In the process according to the present invention the alumina-based spent catalysts are firstly treated at elevated temperature with steam. This steam treatment is preferably carried out at a temperature above 200° C. and in particular at a temperature in the range from 250°–500° C. As a result of the treatment of the deactivated alumina-based catalysts with steam, the subsequent treatment with an oxygen-containing gas at elevated temperature is much easier to control and requires moreover much less time.

The treatment of the deactivated alumina-based catalysts with an oxygen-containing gas at elevated temperature is preferably carried out at a temperature in the range from 300°–750° C. and in particular at a temperature in the range from 350°–550° C. Thereby it is preferred to use air or a mixture of air and nitrogen as the oxygen-containing gas. The treatment with the oxygen-containing gas may be carried out directly after the treatment with steam, but also at a later moment, after the samples have been cooled.

In the final step of the regeneration method according to the invention, the alumina-based spent catalysts are exposed to a treatment with a basic medium. Suitably the basic medium is ammonia or a water soluble salt of a weak acid, such as a carbonate, cyanate, carbamate, formate, benzoate, citrate, lactate, selate, oxalate, salicylate or equivalent basic materials. Good results have been obtained by using an ammonia/ammonium salt buffer, e.g., having a pH of 9–12. Preferably, use is made of an ammonia/ammonium carbonate buffer of pH 10. The treatment with the basic medium is preferably carries out at a temperature in the range from 5°–100° C.

Thus, the present invention provides a method of reactivating an alumina-based catalyst, while substantially retaining the physical properties thereof which comprises (a) contacting deactivated alumina-based catalyst with steam at elevated temperature;

(b) thereafter burning the carbonaceous matter from the catalyst in the presence of an oxygen-containing gas;

(c) subsequently treating the catalyst with a basic medium; and (d) recovering a reactivated catalyst having substantially the physical properties of the catalyst prior to deactivation.

If the alumina-based catalysts contain one or more metals with hydrogenating activity other than vanadium and nickel, such as cobalt, molybdenum or tungsten, it is likely that in the regeneration process according to the invention at least part of these metals is removed from the reactivated catalyst together with vanadium and nickel. Thus, if the regenerated catalyst is to be used in a process wherein the presence of part or all of such metals is required, an additional amount of these metals should be supplied to the regenerated catalyst to maintain their desired metal(s) level, e.g., by conventional re-impregnation methods known in the art. The regeneration method according to the invention is applicable for alumina-based catalysts which have become deactivated in a process wherein a metal(s)-containing hydrocarbon oil is treated with hydrogen at elevated temperature and pressure. Examples of such treating processes are hydrodesulphurization, hydrocracking and hydrodemetallization. The regeneration method according to the invention is of special importance for the regeneration of spent catalysts used in large hydroconversion processes.

The invention will now be further elucidated with the aid of the following Example.

EXAMPLE

Experiments were carried out using a spent CoMo Al$_2$O$_3$ catalyst, conventionally deoiled with toluene/pentane. Its properties are given in Table 1.

TABLE 1
PROPERTIES OF SPENT CATALYST

| Composition (% w/w) | | | |
|---|---|---|---|
| | Al | | 42.0 |
| | Mo | | 8.1 |
| | Co | | 2.8 |
| | Ni | | 4.0 |
| | V | | 9.0 |
| | C | | 13.3 |
| | S | | 14.7 |
| Side Crushing Strength | (SCS) | (N/cm) | 89 |
| Bulk Crushing Strength | (BCS) | (MPa) | 1.2 |
| Pore Volume | (PV) | (ml/g) | 0.25 |
| Surface Area | (SA) | (m$^2$/g) | 104 |

The spent catalyst was treated with steam at 400° C. for 4 h (dT/dt=100° C./h), whereby use was made of a fixed bed of the catalyst through which a gas flow of atmospheric pressure was led. The composition of the gas was 50/50 steam/nitrogen. After four hours, the steam in the nitrogen flow was slowly (in two hours) replaced by air maintaining a temperature of 400° C. After the steam has been replaced by air, the samples were treated in full air for about four hours. Subsequently the samples were cooled and treated with an ammonia/ammonium carbonate buffer solution (pH=10) at a temperature of 20° C., during 18 hours. The ratio of buffer over spent catalyst was 10 ml/g. The results of the regeneration experiment are shown in Table 2.

TABLE 2
RESULTS REGENERATION EXPERIMENT

| Removal of: | V | 65 |
|---|---|---|
| | Ni | 90 |
| Retention of: | Co | 50 |
| | Mo | 25 |
| | SA | 100 |
| | PV | 100 |
| | SCS | 95 |

It will be clear from the results expressed in Table 2 that the combination of steam hydrolysis/direct decoking/treatment with a basic medium is suitable for the removal of large amounts of contaminating metals from the spent alumina-based catalyst, with substantial retention of the catalyst's surface area, pore volume and side crushing strength.

Said three-step regeneration process—if desired, followed by a re-impregnation with one or more hydrogenation metals—therefore is an attractive regeneration method for spent alumina-based catalysts.

What is claimed is:

1. A method for regeneration of a spent alumina-based catalyst used in treating metal contaminated hydrocarbon feedstocks, consisting essentially of an alumina support and containing one or more metals with hydrogenating activity selected from the group consisting of vanadium, nickel, cobalt, molybdenum and tungsten by the removal of at least carbonaceous matter and contaminating vanadium and nickel metal(s), under controlled conditions comprising:
    (a) contacting said catalyst with steam at an elevated temperature above 200° C. to remove at least part of the sulphur present in said catalyst,
    (b) thereafter, burning carbonaceous matter from the catalyst in the presence of an oxygen-containing gas at a temperature in the range from 300°–750° C., and
    (c) subsequently treating the catalyst with a basic medium comprising a buffered aqueous solution of ammonia and ammonium salt of a weak acid having a pH of 9–12 at a temperature in the range of 5°–100° C.

2. A method according to claim 1 wherein in step (a) the temperature is in the range from 300°–450° C.

3. A method according to claim 1 wherein in step (b) the temperature is in the range from 350°–550° C.

4. A method according to claim 1 wherein the oxygen-containing gas is air or a mixture of air and nitrogen.

5. A method according to claim 1 wherein the basic medium is an ammonia/ammonium carbonate buffer of pH 10.

6. A method according to claim 1 wherein the regenerated catalyst is re-impregnated with one or more metals having hydrogenating activity.

7. A method according to claim 1 wherein the catalyst is treated by (a) contacting with steam at 300°–450° C., (b) burning the carbonaceous matter at 350°–550° C., and (c) treating the catalyst with a buffered aqueous solution of an ammonia or an ammonium salt having a pH of 10.

8. A method according to claim 7 wherein the regenerated catalyst is re-impregnated with one or more metals having hydrogenating activity.

9. A method for reactivating a deactivated alumina-based catalyst used in treating metal contaminated feedstocks consisting essentially of an alumina support and containing one or more metals having hydrogenating activity selected from the group consisting of vanadium, nickel, cobalt, molybdenum and tungsten, while substantially retaining the physical properties thereof which comprises:
    (a) contacting deactivated alumina-based catalyst with steam at an elevated temperature above 200° C. to remove at least part of the sulfur present in said catalyst;

(b) thereafter burning carbonaceous matter from the catalyst in the presence of an oxygen-containing gas at a temperature in the range from 300°-750° C.; and (c) subsequently treating the catalyst with a basic medium comprising a buffered aqueous solution of ammonia and ammonium salt of a weak acid having a pH of 9-12 at a temperature in the range of 5°-100° C.; and (d) recovering a reactivated catalyst having substantially the physical properties of the catalyst prior to deactivation and substantially free of carbonaceous matter and contaminating metals.

10. A method according to claim 9 wherein the reactivated catalyst is re-impregnated with one or more metals having hydrogenating activity.

11. A method according to claim 9 wherein in step (a) the temperature is in the range from 300°-450° C.

12. A method according to claim 9 wherein in step (b) the temperature is in the range from 300°-550° C.

13. A method according to claim 9 wherein the oxygen-containing gas is air or a mixture of air and nitrogen.

14. A method according to claim 9 wherein the basic medium is an ammonia/ammonium carbonate buffer of pH 10.

* * * * *